Patented Aug. 11, 1931

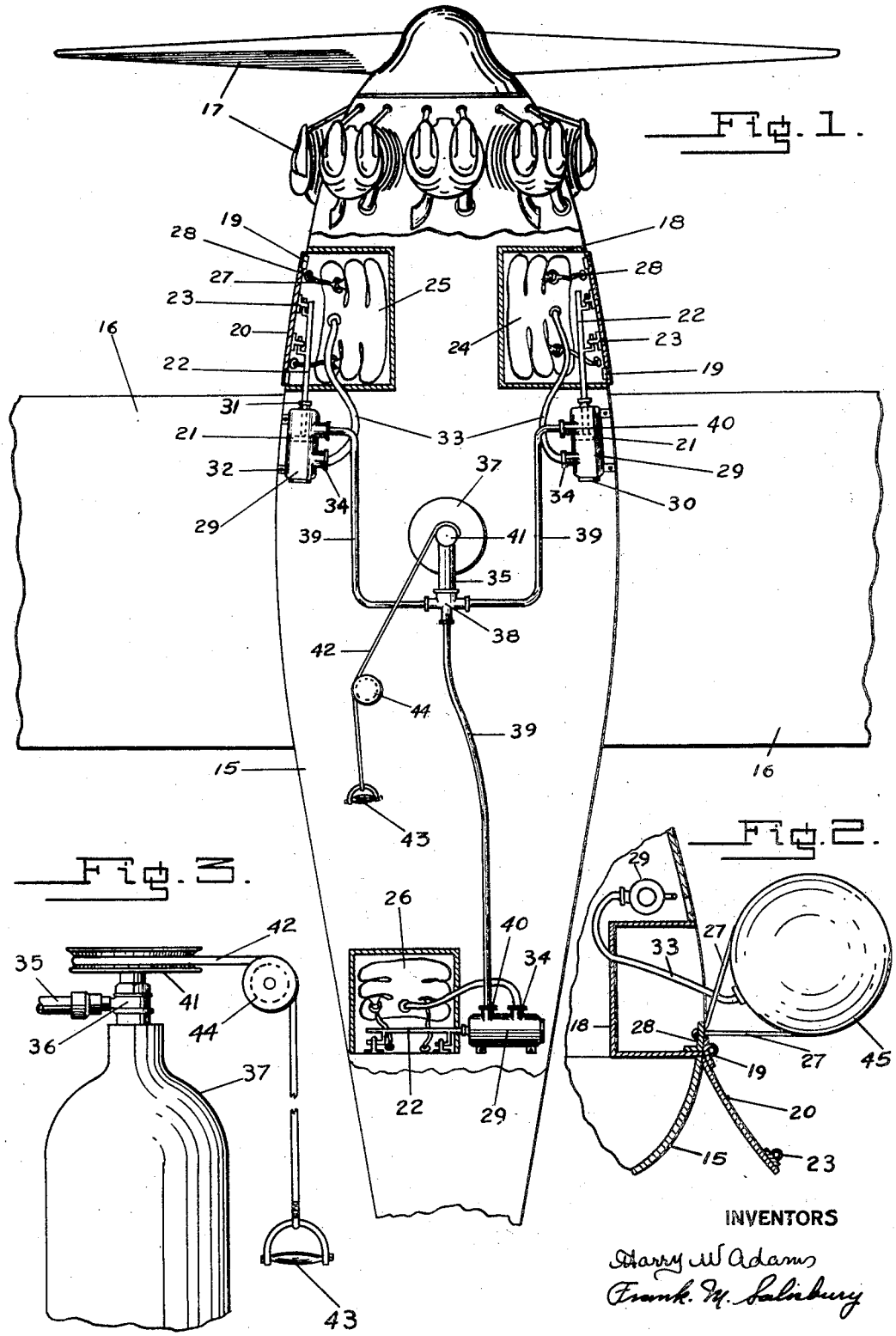

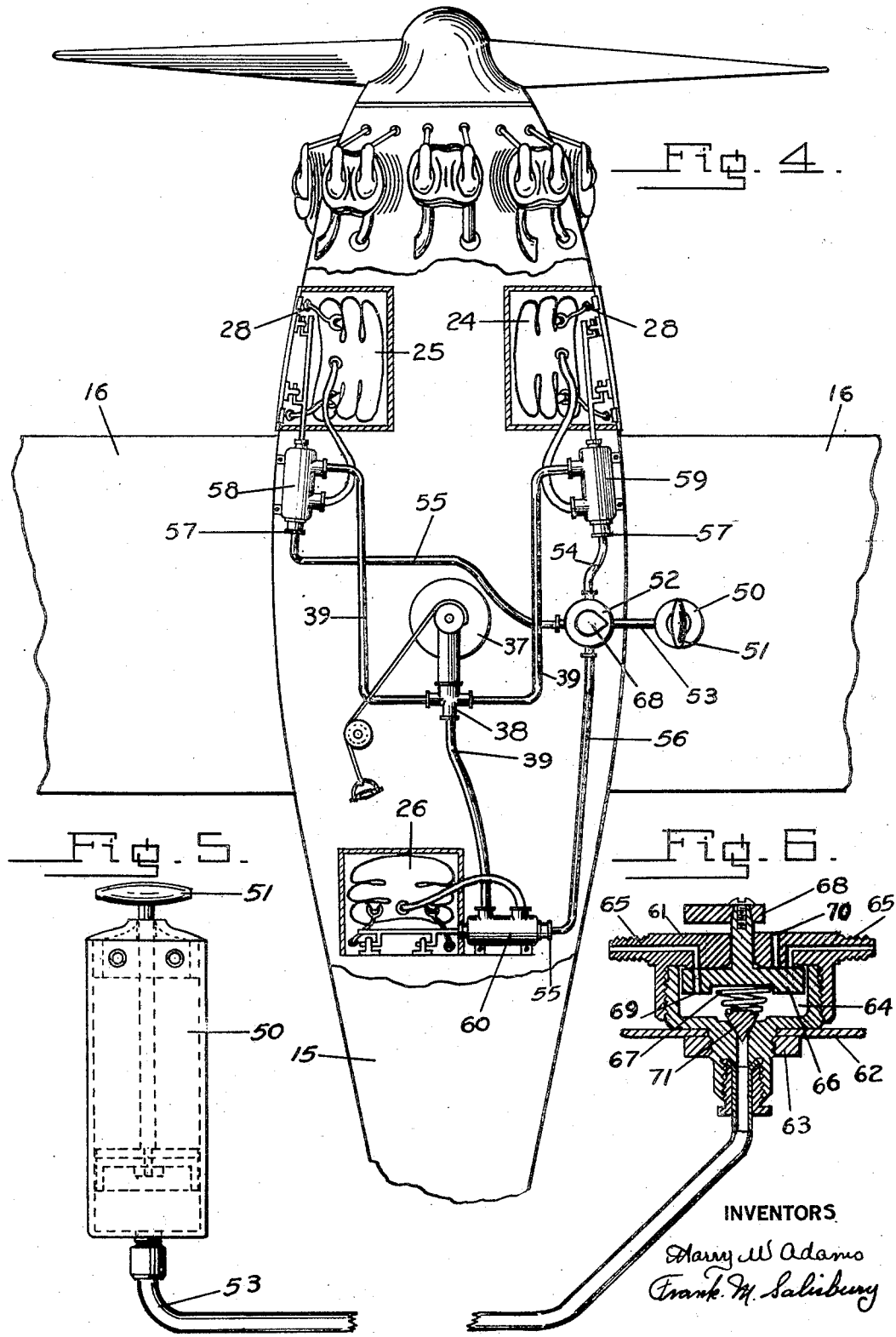

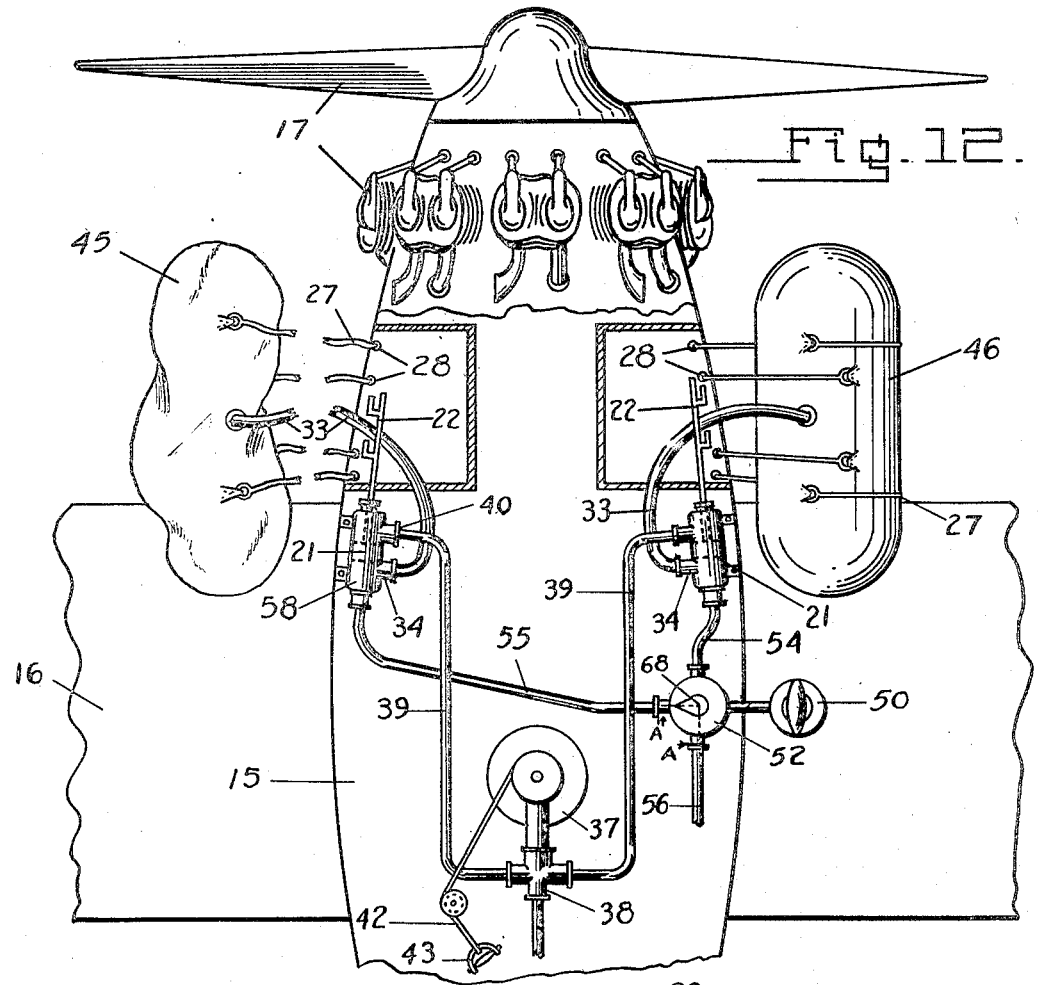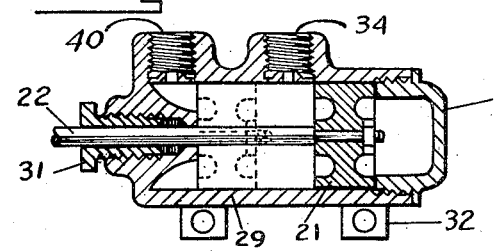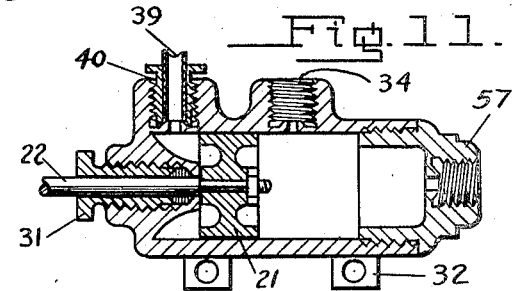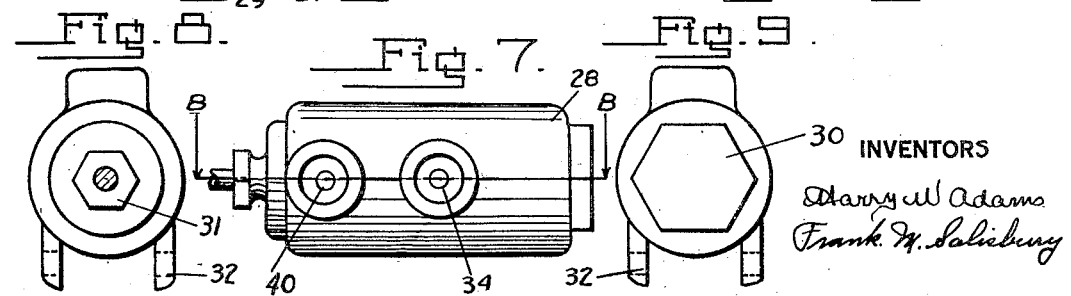

1,818,597

UNITED STATES PATENT OFFICE

HARRY W. ADAMS AND FRANK M. SALISBURY, OF DUNDALK, MARYLAND, ASSIGNORS TO THE GLENN L. MARTIN CO., OF BALTIMORE, MARYLAND, A CORPORATION OF MARYLAND

AIRPLANE FLOTATION SYSTEM

Application filed July 20, 1929. Serial No. 379,776.

Our invention relates to aircraft emergency flotation systems and has particular reference to apparatus incorporated therewith which greatly increases their effectiveness and reliability, especially under extraordinary emergency conditions.

In the event of a forced landing on water an airplane will sink unless provision be made to float it. Apparatus for this purpose is required to be light, to occupy a minimum of space when not in use, to not introduce parasitic resistance, when emergency arises it must function instantly with a minimum expenditure of time and effort on the part of the pilot. Inflatable bags have been used as a means of floating a disabled airplane but experience with the auxiliary apparatus required for their operation has shown that marked deficiencies existed in the system. Compressed air to be used for inflating the bags required cumbersome tanks of considerable weight for retention of an adequate supply of air to provide sufficient displacement to support the weight of an airplane and the crew. Substitution of a bottle of liquefied $CO_2$ gas solved the problem of excessive weight and space occupied by the type of pressure tank formerly used but it introduced other difficulties which are overcome by the instant invention. For example, the rapid expansion of liquefied $CO_2$ gas when released from the bottle to the pipes leading to the flotation bags caused rapid fall in temperature, a temperature so low as to destroy the effectiveness of check valves as heretofore used in systems of this type, in fact they were frozen quite solid. Freezing frequently caused the isolation of one or more bags from the system thus concentrating the gas pressure to the remaining bag causing its disruption. The exceedingly small increment of time required for the bags to inflate from a source of pressure amounting to approximately 1000 pounds per square inch necessitates the release of the bags from their storage compartments in advance of inflation that serious damage to the aircraft structure be prevented.

The system herein described and illustrated comprises inflatable bags with their associated mechanisms in number and size as required by the weight and design of the airplane. The bags are normally deflated and stored in small compartments within the fuselage adjacent the outer surface of the craft which location is such as not to offer resistance to the airstream. The compartments are normally closed by locked doors, preferably spring hinged, to automatically open outwardly when released by their locks. Means is provided whereby the locks are automatically opened in advance of bag inflation that the bags may not meet with resistance when leaving their compartments. Novel locking and pressure transfer mechanism is provided by which unlocking and opening of doors followed by inflation and ejection of bags is assured in proper sequence for reliable and safe operation. Gas for inflation is obtained from a liquefied $CO_2$ supply because of the minimum volume and weight occupied by a high pressure storage bottle of this type which may be stored in any available place and its release valve opened by a cable operated from the pilot's cockpit thus more efficiently utilizing a limited space.

The solution of the enumerated problems was still short of applicants' final objective, viz, the provision of a complete flotation system which will function effectively under ultra adverse conditions, such for example as the loss of stored gas pressure previous to requirement for emergency flotation, or loss of flotation due to rupture of a bag or of the piping leading thereto; or, in the case of a ruptured bag, loss of gas from the intact bags through the pipe lines leading to the defective bag. The instant invention guards against the specified contingencies by providing manually operated means whereby compressed air supplements or replaces that from the $CO_2$ pressure storage tank, acts to isolate the defective part of the flotation system and to reinflate the remaining bags thereby enabling the pilot to save himself and his craft insofar as is humanly possible.

The systems will be understood by reference to the description of the accompanying drawings, the explanation of the several units and their individual and collective functions.

The first sheet of drawings illustrates our emergency flotation system in which,—

Fig. 1 is a plan view of a fragment of an airplane fuselage showing the cooperative relation of our flotation units under normal flying conditions.

Fig. 2 is an end elevation view of an inflated flotation bag ejected from its storage compartment into position for supporting the aircraft on water.

Fig. 3 is an elevation view of a conventional $CO_2$ high pressure bottle with a remote control cable attached.

The second and third sheets of drawings illustrate our ultra emergency flotation system in which,—

Fig. 4 is a plan view similar to Fig. 1, with the addition of the supplementary units comprising our system as adapted to meet conditions arising from accidents to the system Fig. 1.

Fig. 5 is an elevation view of a conventional hand pump used with system Fig. 4.

Fig. 6 is an elevational cross-section of a selective valve adapted to control the distribution of compressed air from pump Fig. 5, to the cylinder-piston mechanisms and bags of Figs. 4 and 12, section is through A—A Fig. 12.

Fig. 7 is a top plan view of a cylinder-piston lock and transfer valve mechanism as used in Fig. 1.

Fig. 8 is an end view of Fig. 7 looking at the piston rod end.

Fig. 9 is an end view of Fig. 7 looking at the closed end.

Fig. 10 is an elevational cross-section of the cylinder-piston lock and transfer valve mechanism through B—B of Fig. 7 as used in system Fig. 1.

Fig. 11 is an elevational cross-section of a cylinder-piston lock seal and transfer valve mechanism as adapted from Figs. 7 and 10 by substituting an auxiliary inlet fitting for the end cap. It is used in system Fig. 4 and 12.

Fig. 12 is a plan view similar to Fig. 4, but showing one bag inflated into flotation position and one bag as having broken its gas supply tube.

Referring to Fig. 1, it illustrates an airplane flotation system adapted to function under ordinary emergency conditions. The deflated flotation bags are shown as compacted and stored in their compartments during normal flight. A fragment of an airplane fuselage is shown at 15, wings 16, power plant 17, flotation bag storage compartments 18, spring hinges 19 adapted to open the bag compartment doors 20 when piston 21 moves piston rod lock member 22 from engagement with catches 23, deflated bags 24—25—26, cables 27 attach the bags to fuselage 15 at 28, cylinder-piston mechanisms 29 attached to fuselage 15 at 32, cylinder closure cap 30, packing nut 31, tubes 33 leading from deflated bags 25—26—27 to outlets 34 of cylinder-piston mechanisms 29, tube 35 leads from the valve 36 of $CO_2$ bottle 37 to distributor fitting 38, tubes 39 lead from 38 to the inlets 40 of cylinder-piston mechanisms 29. Valve 36 is adapted to be opened by turning of wheel 41 by cable 42 when pulled by handle 43. Pulleys 44 are provided where necessary for guidance of cable 42. Handle 43 may be located in the cockpit of the fuselage convenient for operation by the pilot and the bottle 37 may be located where convenient for service replacement.

Referring to Fig. 2, a flotation bag corresponding to 24 of Fig. 1 is shown inflated at 45 and ejected from compartment 18 into a position wherein it is adapted to float the aircraft should it be compelled to alight on water. Door 20 is shown in position as opened by spring hinges 19 when the piston rod lock member 22 is retracted from catches 23. The catches normally retain the door in closed relation to the bag storage compartments against the opening tendency of the springs and until released by withdrawal of piston rod lock member 22 when piston head 21 is forced ahead by gas pressure entering 29 at 40.

Referring to Fig. 3, 36 is a valve adapted to control the pressure from a supply of liquefied $CO_2$ gas under high pressure contained in a conventional bottle 37. A grooved wheel 41 is attached to the stem of the valve and is adapted to release the valve when turned by pulling cable 42.

The operation sequence of Fig. 1 is as follows,—

In the event of a forced landing on water, the pilot opens valve 36 by pulling handle 43. Gas passes into the pipe 35 then to the distributor fitting 38, into the pipes 39, then to the inlet ports 40 of the cylinder-piston mechanisms 29 and forces piston heads 21 from the dotted position to the position shown by solid lines in Fig. 10 thereby withdrawing the attached lock member 22 from catches 23 which permits springs 19 to open doors 20. Also, movement of piston 21 to the solid line position shown in Fig. 10 transfers gas pressure from inlet 40 to outlet 34, then by way of tubes 33 to deflated bags 24—25—26 causing their inflation and ejection from their compartments to the position shown in Fig. 2 wherein their volume of water displacement prevents sinking of the airplane. The ports of individual cylinders remain open to each other until piston rod lock 22 is restored to position wherein it is adapted to engage catch 23.

Referring to Fig. 4, it comprises a flotation system similar to that of Fig. 1 but having incorporated therewith certain additional units adapted to insure safety of the aircraft and its crew under ultra-emergency conditions. A conventional manually operable air pump 50 having an operating handle 51 is attached to the aircraft preferably outside of the cockpit and convenient to the pilot. Pump 50 is joined to a selective valve 52 by pipe 53. Pipes 54—55—56 lead from selective valve 52 to the auxiliary inlet ports 57 of cylinder-piston mechanisms 58—59—60.

Fig. 5 is a view showing more in detail the conventional air pump 50 as joined to selective valve 52 by pipe 53 in Fig. 4.

Fig. 6 is a reduced cross-sectional view of our selective valve 52 comprising a body 61 supported on a structural member 62 in any convenient manner as by nut 63. Body 61 has a chamber 64 communicating individually with outlet fittings 65. A disc valve member 66 is held against a ground seat on the interior wall of the body 61 by a spring 67 and is adapted to be rotated by handle 68 to such positions that the air passage 69 will progressively and selectively coincide with one of the passages leading to an outlet fitting 65, or turned to a position wherein the chamber 64 is closed. A vent 70 to atmosphere may be provided through the wall of body 61 but normally sealed from chamber 64 by disc valve member 66 irrespective of its angular position. Manual pressure on handle 68 against spring 67 unseats disc valve member 66 thereby opening atmospheric vent 70 to chamber 64 thus intentionally and simultaneously releasing pressure from pipe lines 54—55—56. Vent 70 is not essential because the necessarily loose fit of the disc valve shaft is sufficient for escape of air when handle 68 is depressed. A return check 71 is incorporated with the chamber 67 and seated by spring 67 until unseated by air pressure from pump 50; or a check may be incorporated with the pump members in lieu of 71. Check valves in the air lines from the air pump to the auxiliary inlets of the cylinder-piston mechanisms are permissible because the air pressure is low compared to that of the $CO_2$ gas stored in bottle 37.

The cubic content design of the floatation bags is equal to the calculated volume of the gas supply within bottle 37 hence the importance of maintaining substantially unobstructed passage of gas throughout the system to insure against over inflation of one bag at the expense of the others.

The interior construction and the operation of our cylinder-piston lock transfer valve mechanisms as illustrated by Figs. 7-8-9 is more clearly disclosed in elevational cross-sectional view Fig. 10 which constitutes corresponding mechanisms used in system Fig. 1. Cylinder 29 is closed at one end by closure cap 30 and at the opposite end by packing nut 31 thru which the piston rod lock member 22 is adapted to slide. Piston head 21 attached to one end of piston rod lock member 22 is adapted to move longitudinally within the cylinder 29 toward cap 30 when gas pressure enters at 40 in which position it remains until manually returned to a position between the inlet and outlet ports. It is shown by heavy lines in such a position that the outlet port 34 is in communication with the inlet port 40, and by dotted lines in such a position that the outlet port 34 is cut off from communication with inlet port 40. Piston rod lock member 22 is in an unlocking position when piston head 21 is in position indicated by solid lines and in a locking position when piston head 21 is in position indicated by dotted lines. The unlocking and locking positions relate to their association with catches 23 shown in detail Fig. 2. Cylinder 29 is adapted to be attached to a fuselage structural member as by lugs 32.

It is obvious that the inlet and outlet of the cylinder may be reversed from that as described and that the catches on piston rod 22 may be reversed thereby to omit piston rod packing 31 without affecting the operation of our system. However, the interchangeability of parts required for the device to Fig. 11 would be affected.

Referring to Fig. 11, it is a cross-sectional view of our cylinder-piston lock transfer valve and sealing mechanism in which the component parts, excepting the auxiliary inlet fitting, are duplicates of corresponding parts of assembly Fig. 10. Removal of cap 30 and its replacement by the auxiliary inlet fitting 57 of Fig. 11 adapts mechanism Fig. 10 as used in system Fig. 1 to the requirements of our ultra-emergency system as illustrated by Figs. 4 and 12.

Referring to Fig. 12, it comprises the system of Fig. 4 with the exception that illustration of flotation bag system 26 is omitted as unnecessary to an adequate conveyance of an understanding of our system, and with the addition of illustrating a bag 46 deflating after having broken its gas supply tube 33. Air pump 50 and selective valve 52 are preferably located outside the cockpit for reasons hereinafter explained.

The operating sequence of system Fig. 4 conforms to that of Fig. 1 insofar as initial inflation of the flotation bags is concerned, (lines 108–128, page 2) and in addition thereto it provides means whereby the pilot manually operates an air pump to reverse the position of the piston head and to supplement initial inflation from a high pressure supply with air pressure when necessary or in the event that a flotation bag meets with an accident as illustrated in Fig. 12 at 46 whereby part of the flotation displacement is lost and the pilot finds it necessary to leave the cockpit and climb to the upper wing surface. In system Fig. 1 the loss of a bag is fatal to flotation of the craft because of the fact that gas in the remaining bags is lost by return flow through the pipe and cylinder system thence through the broken tube or a bag puncture to atmosphere. This ultra-emergency condition in addition to ordinary emergency conditions are effectively met by the instant invention.

Assuming that normal inflation of bags 24—25—26 has taken place thereafter followed by loss of bag 46, all of the gas contained in bag 46 is lost and at least part of the gas from the intact bags would be lost by return flow through their tubes 33, thence by way of cylinder outlets 34 to the interior of corresponding cylinders, thence to their inlets 40, thence through pipes 39 to the inlet of cylinder 59, thence through its outlet 34 and the broken tube to atmosphere if it were not for the provision of manually controllable means whereby the accidentally opened passage to atmosphere is closed against loss of flotation gas from the remainder of the system. The pilot turns selective valve handle 68 to a position wherein air pump 50 communicates with the auxiliary inlet of the cylinder-piston mechanism corresponding to the crippled bag, 58 as illustrated, then operates the air pump to move the piston head of cylinder 58 to a sealing position between the inlet and outlet ports whereby further loss of gas from the system is prevented. He then turns selective valve 52 to a position corresponding to the auxiliary inlet of cylinder 59 and, by manual operation of the pump, air pressure first moves the piston head to a position communicating the outlet of cylinder 59 thereafter to inflate bag 46 supplementary to gas originally supplied from bottle 37. Obviously he may perform the same operation to supplement inflation of as many bags as are provided on his craft. Confined pressure between selective valve 52 and the auxiliary inlet side of piston heads of the cylinder piston mechanisms is releasable at will by pressing handle 68 which displaces valve member 66 from its seat against spring 67 and allows escape of gas from the cylinders thru vent 70 to atmosphere.

Inflation of the bags by gas from bottle 37 reduces its gas pressure substantially to atmosphere and it is necessary to replace the bottle for subsequent inflation of the bags from that source. Removal of the bottle connection at fitting 38 for servicing and manual shifting of piston heads in the cylinder-piston mechanisms to positions wherein the inlets and outlets are open to each other permits escape of gas from the bags during the operation of compacting them for storage as shown in Figs. 1 and 4.

We wish it to be understood that we do not limit ourselves to the exact details as shown in the drawings which are intended to convey an understanding of the objects and operating principles of our system. The objects are attained substantially in the manner described but variations in construction may suggest themselves to those skilled in the art without material departure from the substance of the following claims,—

1. A cylinder-piston lock and transfer valve mechanism comprising a cylinder having an inlet port, an outlet port, a closure head on one end of said cylinder, a stuffing box head on the other end of said cylinder, a piston head within said cylinder, a piston rod extending through said stuffing box, one end of said rod attached to said piston head and the other end comprising a releasable locking member adapted to engage a relatively stationary lock member, whereby fluid pressure introduced into said cylinder through said inlet port will move said piston head past said outlet port thereby to release said locking members from each other and to transfer said pressure from said inlet port end of said cylinder to said outlet port thence to a flotation bag connected to said outlet port, whereby said pressure retains said piston head in position for return flow of said gas to said tank in response to temperature rise of said gas in said bag.

2. In an aircraft, an emergency flotation system comprising a multiple number of flotation bags attached to said craft, storage compartments for said bags when deflated, outwardly opening doors for said compartments, means for locking said doors in a closed position; cylinder-piston mechanisms associated with said locking means and said bags, the cylinder of each of said mechanisms containing an inlet port and an outlet port; a tank adapted to contain a gas under pressure, a valve adapted to release the gas from said tank to pipes leading from said valve to said cylinder inlet ports, pipes leading from the outlet ports of said cylinders to said bags; whereby when gas is released from said tank by said valve it passes thru said first named pipes to said inlet ports of said cylinders and acts on said pistons to release said door locking means and to release said pressure from said cylinders to inflate said bags, and whereby the inflation pressure in said bags and said cylinders maintains said piston heads in positions whereby said inflation pressure is equalizable throughout the system.

3. In an aircraft, an emergency flotation system comprising a multiple number of flotation bags attached to said craft, storage compartments for said bags when deflated, outwardly opening doors for said compartments, means for locking said doors in a closed position; cylinder-piston mechanisms associated with said locking means and said bags, the cylinder of each of said mechanisms containing an inlet port and an outlet port; a tank adapted to contain a gas under pressure, a valve adapted to release the gas from said tank to pipes leading from said valve to said cylinder inlet ports, pipes leading from the outlet ports of said cylinders to said bags; whereby when gas is released from said tank by said valve it passes thru said first named pipes to said inlet ports of said cylinders and acts on said pistons to release said door locking means and to release said pressure from said cylinders to said bags thereby ejecting said bags from said compartments while in process of inflation and pressure equalization is attained by reverse flow of expanding gas throughout said system from said bags.

4. In an aircraft, an emergency flotation system comprising a multiple number of inflatable bags, said bags flexibly attached to the fuselage of said aircraft, storage compartments for said bags when deflated, said compartments closed by outwardly opening spring operated doors, locks normally retaining said doors in closed position against the opening action of said springs; cylinder-piston mechanisms operatively associated with said bags and said locks, each of said mechanisms comprising a cylinder having an inlet and an outlet port, a closure head on one end of said cylinder, a stuffing box head on the opposite end of said cylinder, a piston head within said cylinder, a piston rod extending thru said stuffing box, one end of said piston rod attached to said piston head and the other end operatively connected to one of said locks whereby when said lock is closed said outlet port of said cylinder is closed from said inlet port by said piston head; a tank adapted to contain a gas under pressure, a valve adapted to release the gas from said tank to pipes leading from said valve to the inlet ports of said cylinders, means for remote control of said valve, tubes leading from the outlet ports of said cylinders to said bags whereby when said gas is released from said tank it passes to said inlet port end of said cylinders to cause said pistons and said rods to release said locks whereby said doors are opened and thereafter to open said outlet ports followed by the inflation and forceful ejection of said bags from said storage compartments to a flotation position outside the fuselage of said aircraft and interchange of pressure takes place through said tubes, said cylinders and said bags.

5. A cylinder-piston lock and transfer valve mechanism comprising a cylinder having a main inlet port, an auxiliary inlet port, an outlet port longitudinally located between said inlet port and said auxiliary inlet port, a closure head on one end of said cylinder, a stuffing box head on the other end of said cylinder, a piston head within said cylinder, a piston rod extending through said stuffing box, one end of said rod attached to said piston and the other end comprising a movable locking member adapted to engage a relatively stationary lock member, whereby fluid pressure introduced into said cylinder through said main inlet port will move said piston head in one direction past said outlet port thereby to release said locking members from each other and to transfer said pressure from said main inlet port end of said cylinder to said outlet port, and whereby supplementary fluid pressure introduced into said cylinder through said auxiliary intake port will move said piston head in the opposite direction past said outlet port thereby to restore said movable locking member and to transfer said pressure from said auxiliary inlet port end of said cylinder to said outlet port and to seal said main inlet port from said outlet port.

6. In an aircraft, an emergency flotation system comprising a multiple number of flotation bags attached to said aircraft, storage compartments for said bags when deflated, outwardly opening doors for said compartments, means for locking said doors in closed position; cylinder-piston-mechanisms associated with said locking means and said bags, the cylinder of each of said mechanisms containing an inlet port, an outlet port and an auxiliary inlet port; a tank adapted to contain a gas under pressure, a valve adapted to control the flow of gas from said tank to pipes leading from said valve to said inlet ports, pipes leading from the outlet ports of said cylinders to said bags; a manually operable air pump, a selective valve associated with said air pump, pipes leading from said selective valve to the auxiliary inlet ports of said cylinders; whereby when gas is released from said tank by said valve it passes thru said first named pipes to said inlet ports of said cylinders to act on said pistons to release said door locking means and to release said pressure from said cylinders to inflate said bags and whereby when air pressure created by said manually operable air pump and transmitted by said transfer valve to one of said last named pipes leading to the auxiliary inlet port of one of said cylinders will move said piston to an intermediate position between the said inlet and outlet ports of said cylinder whereby return passage of gas through said pipes from the intact bags of said flotation bag system to a defective flotation bag system is prevented.

7. In an aircraft, an emergency flotation system comprising a multiple number of flotation bags attached to said aircraft, storage compartments for said bags when deflated, outwardly opening doors for said compartments, means for locking said doors in a closed position; cylinder-piston-mechanisms associated with said locking means and said bags, the cylinder of each of said mechanisms containing an inlet port, an outlet port and an auxiliary inlet port; a tank adapted to contain a gas under pressure; a valve adapted to control the flow of gas from said tank to pipes leading from said valve to said inlet ports, means for remote control of said valve, pipes leading from the outlet ports of said cylinders to said bags; a manually operable air pump, a selective valve associated with said air pump, pipes leading from said selective valve to the auxiliary inlet ports of said cylinders; whereby when gas is released from said tank by said valve it passes thru said first named pipes to said inlet ports of said cylinders to act on said pistons to release said door locking means and to release said pressure from said cylinders to inflate said bags and whereby when air pressure is created by said manually operable air pump and transmitted by said transfer valve to one of said last named pipes leading to the auxiliary inlet port of one of said cylinders said piston will be moved to an intermediate position between the said inlet and outlet ports of said cylinder whereby return passage of gas through said pipes from the intact bags of said flotation bag system to a defective flotation bag system is prevented.

8. In an aircraft, an emergency flotation system comprising a multiple number of flotation bags attached to said airplane, storage compartments for said bags when deflated, outwardly opening doors for said compartments, means for locking said doors in a closed position; cylinder-piston mechanisms associated with said locking means and said bags, the cylinder of each of said mechanisms containing an inlet port, an outlet port and an auxiliary inlet port; a tank adapted to contain a gas under pressure, a valve adapted to control the flow of gas from said tank to pipes leading from said valve to said inlet ports, pipes leading from the outlet ports of said cylinders to said bags; a manually operable air pump, a selective valve associated with said air pump, pipes leading from said selective valve to the auxiliary inlet ports of said cylinders whereby when gas is released from said tank by said valve it passes thru said first named pipes to said inlet ports of said cylinders to act on said pistons to release said door locking means and to release said pressure from said cylinders to inflate said bags and whereby air pressure created by said manually operable air pump and transmitted by said selective valve to one of said last named pipes leading to the auxiliary inlet port of one of said cylinders will move said piston to an intermediate position between the said inlet and outlet ports of said cylinder whereby return passage of gas through said pipes from the intact bags of said flotation bag system to a defective flotation bag system is prevented thus to simultaneously isolate a defective bag and supplement inflation of said bags by said gas from said tank by air from said pump.

9. In an aircraft, an emergency flotation system comprising a multiple number of flotation bags attached to said airplane, storage compartments for said bags when deflated, outwardly opening doors for said compartments, means for locking said doors in a closed position; cylinder-piston mechanisms associated with said locking means and said bags, the cylinder of each of said mechanisms containing an inlet port, an outlet port and an auxiliary inlet port; a tank adapted to contain a gas under pressure, a valve adapted to control the flow of gas from said tank to pipes leading from said valve to said inlet ports, means for remote control of said valve, pipes leading from the outlet ports of said cylinders to said bags; a manually operable air pump, a selective valve associated with said air pump, pipes leading from said selective valve to the auxiliary inlet ports of said cylinders whereby when gas is released from said tank by said valve it passes thru said first named pipes to said inlet ports of said cylinders to act on said pistons to release said door locking means and to release said pressure from said cylinders to inflate said bags and whereby air pressure created by said manually operable air pump and transmitted by said selective valve to one of said last named pipes leading to the auxiliary inlet port of one of said cylinders moves said piston to an intermediate position between the said inlet and outlet ports of said cylinder whereby return passage of gas through said pipes from the intact bags of said flotation bag system to a defective flotation bag system is prevented thus to simultaneously isolate a defective bag and supplement inflation of said bags by said gas from said tank by air from said pump.

10. In an aircraft, an emergency flotation system comprising a multiple number of flotation bags, cables attaching said bags to said aircraft, storage compartments for said bags when deflated, outwardly opening doors for said compartments, means for locking said doors in a closed position; cylinder-piston mechanisms operatively associated with said locking means and said bags, the cylinder of each of said mechanisms having an inlet port, an outlet port and an auxiliary inlet port; a tank adapted to contain a gas under pressure, a valve adapted to release gas from said tank to pipes leading from said valve to said inlet ports, means to operate said valve by distant control, pipes leading from said outlet ports to said bags; a manually operable air pump, a selective valve associated with said air pump, pipes leading from said selective valve to the auxiliary inlet ports of said cylinders; whereby when gas is released from said tank by said valve it passes thru said first named pipes to said inlet ports of said cylinders to act on said pistons to release said door locking means and thereafter to transfer said pressure from said cylinders to said bags and whereby when air pressure is created by said manually operable air pump and transmitted by said selective valve to one of said last named pipes leading to the auxiliary inlet port of one of said cylinders said piston will move to an intermediate position between the said inlet and outlet ports of said cylinder whereby return passage of gas thru said pipes from an inflated flotation system is prevented, and thereafter air pressure produced by manual operation of said air pump and transmitted by said selective valve to another of said cylinders, thence to a corresponding flotation bag, supplements the initial inflation by gas from said tank.

11. In an airplane flotation system, a flotation bag capable of deflation for storage, a storage compartment for said bag, hinged closure means for said compartment, a releasable catch retaining said closure means in closed relation to said compartment, springs adapted to open said closure means when said catch is released; a cylinder-piston mechanism comprising a cylinder having an inlet, an outlet and an auxiliary inlet, a piston head, a piston rod attached to said head and adapted by its longitudinal movement in one direction to engage said catch and by movement in the opposite direction to release said catch; a tank containing gas under pressure, a shut off valve associated with said tank; a manually operable air pump, a selective valve associated with said pump, said selective valve including a chamber and a manually rotatable and depressible spring seated member adapted by its rotation to control outlets from and an inlet to said chamber and by its depression to vent said chamber to atmosphere, said chamber communicating with the pressure outlet of said pump, a check valve associated with said pump; a pipe connecting said gas valve with the inlet of said cylinder, a tube connecting the outlet of said cylinder with said bag, a pipe connecting said selective valve outlet with the auxiliary inlet of said cylinder; whereby the opening of said shut off valve releases gas from said tank under pressure through said pipe and said cylinder inlet to thereby move said piston head and said rod to progressively release said catch to transfer said pressure from said inlet to said outlet to said tube to said bag and thereafter air pressure from said air pump passage through said check valve and said selective valve thence through said pipe to said cylinder auxiliary inlet to return said piston head to a position wherein said cylinder outlet is closed from said cylinder inlet thereby to isolate said bag from said gas pressure system and to restore said piston rod to a position wherein said comparement closure means is retained against the action of said springs.

12. In an aircraft flotation system, a selective valve mechanism comprising a body member having a chamber, an inlet to said chamber, a multiple number of outlets through a wall of said chamber, a rotatable disc valve member located within said chamber and adapted to seat against said wall, a rotatable shaft attached to said disc and extending through said wall, a handle attached to said shaft, a compression spring adapted to restrain said disc to intimate contact with said wall of said chamber to close said outlets, said disc having a hole therethru adapted to progressively register with either except one of said outlets when said disc is rotated by said handle and whereby depression of said disc by manual pressure on said handle opens said chamber simultaneously to all of said outlets.

13. In an aircraft flotation system, a selective valve mechanism comprising a body member having a chamber, an inlet and a multiple number of outlets from said chamber, a rotatable disc valve having a hole therethru and located within said chamber, a rotatable shaft attached to said disc and extending through a wall of said chamber, a handle attached to said shaft, a compression spring adapted to restrain said disc to intimate contact with said wall of said chamber, said disc adapted by its position and rotation to selectively register said hole with either of said outlets or to close said outlets and whereby depression of said disc by manual pressure on said handle releases said disc from the wall of said chamber to simultaneously vent said chamber and said outlets to atmosphere through a passage normally closed by said disc.

In testimony whereof we hereunto affix our signatures this 19th day of July, 1929.

HARRY W. ADAMS.
FRANK M. SALISBURY.